Patented Aug. 14, 1951

2,563,835

UNITED STATES PATENT OFFICE 2,563,835

FOOD ANTIOXIDANTS

Myers F. Gribbins and Harry R. Dittmar, Wilmington, Del., assignors to E. I. du Pont de Nemours & Company, Wilmington, Del., a corporation of Delaware No Drawing. Application April 1, 1949, Serial No. 85,028

11 Claims. (Cl. 99—150)

This invention relates to the stabilization of animal feeds, soaps, soap products, and cereals; to the retardation in loss of potency of vitamins; to the inhibition of rancidity in animal, vegetable or fish oils, fats or waxes; and to the stability of foods. The invention is more particularly related to the use of a substituted beta-mercaptopropionic acid with other antioxidants for the aforesaid and like purposes. This application is a continuation in part of our copending application S. N. 57,426 filed October 29, 1948.

It is well known that comestibles, pharmaceuticals, cosmetics, and forage materials deteriorate on standing in contact with air by loss of flavor, potency and/or odor, frequently to such an extent that they become wholly unsuitable for ingestion or use. A number of patents have issued which provide means of extending the useful life of some of these products, and for the most part these patents describe the use of various types of antioxidants such as: the beta-substituted-mercaptopropionic acids and their esters— U. S. 2,397,960; U. S. 2,397,976; 2,416,052; nordihydroguaiaretic acid—Brazil Patent 34,370, and compounds having the formula HN:C(NHR)R' in which R and R' are H, alkyl, acyl, alkylol, NH₂, OH, CONH₂, CN, esterified carboxyl, guanido or CONHNH₂—Danish Patent 64,773. These antioxidants vary in their effectiveness, but they all, by and large, have the disadvantage of high cost. The desirability of extending their utility by decreasing cost is apparent.

An object of the present invention is to provide a composition of matter which on addition to antioxidants gives a total effect that is greater than the sum of the effects taken independently. A specific object is to provide new compositions of matter comprising a compound containing a HOOCCH₂CH₂S—X group, hereinafter particularized, citric acid and a phenolic antioxidant. A further object is to provide, as new compositions of matter, antioxidants and a beta-substituted-mercaptopropionic acid incorporated in animal, vegetable or fish oils, fats or waxes; vitamins, cereals, soaps and soap products, animal feeds and other comestibles, pharmaceuticals, cosmetics, and forage materials subject to deterioration due to oxidation or related degradation. Other objects and advantages of the invention will appear hereinafter.

These and other objects are accomplished in accord with the invention by the preparation and use of a composite antioxidant comprising a beta-substituted propionic acid, citric acid and a phenolic antioxidant. It has been known that the beta-substituted-mercaptopropionic acids are antioxidants for use in food and food products, and particularly for use in the treatment of fats, oils and waxes, to inhibit the development of rancidity. It was not known, however, that by the addition of these acids to another antioxidant the resulting improved effectiveness would not be the arithmetical sum of the separate antioxidants, but an effect greater than the sum of the two effects; in other words, that by this addition a synergistic effect was attained. This synergism does not appear to be limited to specific combinations, but is broadly applicable to combinations of beta-mercaptopropionic acids with antioxidants generally and more especially with the phenolic antioxidants such as the alkylated hydroxyanisols, hydroquinone, and gum guaiac.

Moreover, the surprising discovery has been made that a multiple component antioxidant, containing as the effective ingredients: a beta-substituted-mercaptopropionic acid, citric acid and a phenolic antioxidant such as an alkylated hydroxyanisole, particularly butylated hydroxyanisole, is far superior to the arithmetical sum of the protective ability of the separate antioxidants thus giving a mixture having a double synergistic effect.

Beta-beta-thiodipropionic acid (thiodipropionic acid) appears to be outstanding in its ability to improve the stabilizing properties of antioxidants generally and is the first member of the composite antioxidant of the invention. There are a number of related beta-substituted-mercaptopropionic acids, however, that have a similar influence and these acids may be described as having this structure:

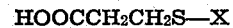

HOOCCH₂CH₂S—X in which the monovalent substituent "—X" of the sulfur group is: a hydrocarbon group, an oxygenated-hydrocarbon group, a sulfur-hydrocarbon group, a sulfur-and oxygenated-hydrocarbon group, or a sulfur-nitrogen-hydrocarbon group. These substituents of mercaptopropionic acid are more fully described in U. S. Patent 2,397,960, issued April 9, 1946, wherein examples of the derivatives are abundantly described among which are included respectively, 3-methylmercaptopropionic acid, 3-hydroxymethyl mercaptopropionic acid, 3-mercaptoethyl mercaptopropionic acid, carboxyethiaethyl mercaptopropionic acid, and 3-benzothiazyl mercaptopropionic acid.

While the hydrocarbon, alcohol, ether, aldehyde, and acid derivatives of beta-mercaptopropionic acid are advantageously used alone with the other antioxidants to give the double synergistic effect, mixtures of them may likewise be used. Why the acid or mixtures thereof when used with an antioxidant has this surprising influence is not understood, but it has been found that in all instances in which these acids have been added to an antioxidant, antioxidational synergism is present.

Citric acid appears to be unique as the second ingredient of the multiple component antioxidant with as the third essential ingredient an alkylated hydroxyanisole such as for example, a methylated, ethylated, propylated or higher alkylated hydroxyanisole and more especially butylated hydroxyanisole.

The composite antioxidant should contain on a weight basis preferably equal amounts of each component although their proportions may be varied over a fairly wide range from 1:1:1 to 10:1:1 to 10:10:1.

The double synergistic antioxidant is added to the material to be protected in amounts ranging between 0.001 to about 0.1% of the total weight of material with the preferred amount being determined by the duration of protection desired, the greater the protection, the greater the amount of the composite antioxidant.

The mixtures of a beta-substituted-mercaptopropionic acid with the other antioxidants may be added separately to the product to be preserved or dissolved first in a mutual solvent of the mixture and the resulting solution added to the product. Examples of suitable mutual solvents are propylene glycol, glycerine, liquid fats, purified mineral oil, etc.

A preferred composition which is adaptable to convenient and efficient packaging contains in parts by weight from 5 to 15, preferably 10 parts of thiodipropionic acid; from 2 to 10, preferably 5 parts of citric acid; from 5 to 25, preferably 20 parts of butylated hydroxyanisole; and from 55 to 75, preferably 65 parts of propylene glycol. This solution may be diluted prior to use with any suitable non-toxic solvent or added without dilution directly to the material that is to be protected.

The surprising and unexpected rancidity inhibiting effect, stabilizing influence, potency retention and freshness extension of the substituted-beta-mercaptopropionic acids, when added to antioxidants, are demonstrated by the following test: The test was conducted by a method generally known as the Swift test. This method is described in "Oil and Soap" 10, 105–109 (1933), in an article by A. E. King et al., "An Accelerated Stability Test Using the Peroxide Value as an Index." Briefly stated, this test involves placing the oil to be tested in a constant temperature bath and subsequently bubbling air through the products. There follow results obtained on a treatment of lard with representative mixtures of antioxidant and a thiodipropionic acid in the Swift test. The peroxide value, as described in the above article, is a measure in degree of rancidity, each product or fat having a fairly definite peroxide value at which it is definitely rancid.

TABLE I

| | Hours |
|---|---|
| Lard | 2¼ |
| Lard 0.05 TDPA [1] | 20¼ |
| Lard 0.10 CA [2] | 2½ |
| Lard 0.05 TDPA+0.10 citric acid | 64 |

[1] Thiodipropionic acid.
[2] Citric acid.

Tables II, III and IV illustrate respectively the synergistic action of citric acid on thiodipropionic acid, of thiodipropionic acid on butylated hydroxyanisole, and of citric acid, and thiodipropionic acid on butylated hydroxyanisole. The three component action is surprisingly superior to the arithmetical sum of the individual actions.

TABLE II

Synergistic action of citric acid on thiodipropionic acid

| | Hours |
|---|---|
| Lard | 1 |
| Lard+0.01% TDPA | 18 |
| Lard+0.01% TDPA+0.01% CA | 36 |

TABLE III

Synergistic action of thiodipropionic acid on butylated hydroxyanisole

| | Hours |
|---|---|
| Lard | 4 |
| Lard+0.01% TDPA | 23 |
| Lard+0.01% BHA [3] | 47 |
| Lard+0.01% TDPA+0.01% BHA | 101 |

[3] Butylated hydroxyanisole.

TABLE IV

Synergistic action of a combination of citric acid and thiodipropionic acid on butylated hydroxyanisole

| | Hours |
|---|---|
| Lard | 6 |
| Lard+0.01% CA | 8 |
| Lard+0.01% TDPA | 12 |
| Lard+0.01% BHA | 39 |
| Lard+0.01% TDPA+0.01% CA | 44 |
| Lard+0.01% BHA+0.01% CA | 41 |
| Lard+0.01% TDPA+0.01% BHA | 67 |
| Lard+0.01% TDPA+0.01% CA+0.01% BHA | 136 |

The synergised antioxidant mixtures of the invention are exceptionally useful in the treatment of various oils, fats, waxes and other products subject to deterioration on standing or storing. The composite antioxidants are particularly effective for the treatment of vegetables, animal, and fish oils, fat-containing foods such for example, as lard, butter, oleomargarine, olive oil, corn oil, cod liver oil, ice cream, mayonnaise, salad dressing, means as well as products containing these materials such as pastry, cakes, crackers, cookies, bread, potato chips, doughnuts, popcorn and the like. The products are likewise suitable for the treatment of soaps and soap products, for the addition to carotenes, vitamin A and vitamins generally to maintain their initial potency, for addition of cereals to maintain their palatability and for addition to animal feeds, cosmetics, pharmaceuticals, human comestibles which deteriorate due to oxidation and allied causes.

We claim:

1. A multiple component antioxidant adaptable for inhibiting the rancidity of materials selected from the group consisting of animal, vegetable and fish oils, fats and waxes; vitamins, cereals, soaps and soap products, animal feeds, comestibles, pharmaceuticals, comestics and forage materials susceptible to oxidative rancidification which comprises an antioxidant containing a beta-substituted-mercaptopropionic acid, having the structural formula $HOOCCH_2CH_2S-X$ in which the monovalent X is a member of the group consisting of hydrocarbon, oxygenated-hydrocarbon, sulfur-hydrocarbon, sulfur and oxygenated hydrocarbon, and sulfur-nitrogen hydrocarbon groups, citric acid and an alkylated hydroxyanisole, present on a weight basis and respectively within these proportions 1:1:1 to 10:1:1 to 10:10:1.

2. The composition of claim 1 in solution in a mutual solvent of the components.

3. A multiple component antioxidant adaptable for inhibiting the rancidity of materials selected from the group consisting of animal, vegetable and fish oils, fats and waxes; vitamins, cereals, soaps and soap products, animal feeds, comestibles, pharmaceuticals, comestics and forage materials suscepitble to oxidative rancidification which comprises thiodipropionic acid, citric acid and an alkylated hydroxyanisole, present on a weight basis and respectively within these proportions 1:1:1 to 10:1:1 to 10:10:1.

4. The composition of claim 3 in solution in a mutual solvent of the components.

5. A multiple component antioxidant adaptable for inhibiting the rancidity of materials selected from the group consisting of animal, vegetable and fish oils, fats and waxes; vitamins, cereals, soaps and soap products, animal feeds, comestibles, pharmaceuticals, comestics and forage materials susceptible to oxidative rancidification which comprises thiodipropionic acid, citric acid and butylated hydroxyanisole, present on a weight basis and respectively within these proportions 1:1:1 to 10:1:1 to 10:10:1.

6. The composition of claim 5 in solution in a mutual solvent of the components.

7. A comestible subject to oxidative rancidification containing from 0.001 to 1% of a beta-substituted mercaptopropionic acid, having the structural formula HOOCCH$_2$CH$_2$S—X in which the monovalent X is a member of the group consisting of hydrocarbon, oxygenated-hydrocarbon, sulfur-hydrocarbon, sulfur and oxygenated hydrocarbon, and sulfur-nitrogen hydrocarbon groups, citric acid and an alkylated hydroxyanisole present on a weight basis and respectively within these proportions 1:1:1 to 10:1:1 to 10:10:1.

8. A comestible subject to oxidative rancidification containing from 0.001 to 1% of thiodipropionic acid, citric acid and an alkylated hydroxyanisole, present on a weight basis and respectively within these proportions 1:1:1 to 10:1:1 to 10:10:1.

9. A comestible subject to oxidative rancidification containing from 0.001 to 1% of thiodipropionic acid, citric acid and a butylated hydroxyanisole, present on a weight basis and respectively within these proportions 1:1:1 to 10:1:1 to 10:10:1.

10. An antioxidant composition consisting essentially of from 5 to 15 parts of thiodipropionic acid, from 2 to 10 parts of citric acid, from 5 to 25 parts of butylated hydroxyanisole and from 55 to 65 parts of propylene glycol, present on a weight basis and respectively within these proportions 1:1:1 to 10:1:1 to 10:10:1.

11. An antioxidant composition consisting essentially of about 10 parts of thiodipropionic acid, about 5 parts of citric acid, about 20 parts of butylated hydroxy anisole and about 65 parts of propylene glycol.

MYERS F. GRIBBINS.
HARRY R. DITTMAR.

REFERENCES CITED

The following references are of record in the file of this patent:

Kraybill et al.: Studies on Antioxidants, Bull. No. 2, April 1948, Am. Meat Inst. Found.